(12) United States Patent
Eggleton et al.

(10) Patent No.: US 6,303,182 B1
(45) Date of Patent: Oct. 16, 2001

(54) METHOD FOR MAKING OPTICAL FIBER DEVICES HAVING VARIABLE THICKNESS METAL COATINGS

(75) Inventors: Benjamin John Eggleton, Summit, NJ (US); Rebecca Jane Jackman, Boston, MA (US); John A. Rogers, New Providence; Thomas A. Strasser, Warren, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/252,704

(22) Filed: Feb. 18, 1999

(51) Int. Cl.[7] ............................ C03C 25/22; C03C 25/46; B05D 5/06; B05D 1/32; G02B 6/16
(52) U.S. Cl. ................. 427/163.2; 427/282; 427/287; 65/437; 65/445; 65/446; 385/12; 385/37
(58) Field of Search ................................ 427/163.2, 282, 427/287; 65/437, 445, 446; 385/37, 12

(56) References Cited

U.S. PATENT DOCUMENTS

| | | | |
|---|---|---|---|
| 4,814,056 | * | 3/1989 | Welty ............................. 204/298.11 |
| 4,956,000 | * | 9/1990 | Reeber et al. ....................... 65/17.3 |
| 5,784,507 | * | 7/1998 | Holm-Kennedy et al. ............ 385/31 |
| 5,999,671 | * | 12/1999 | Jin et al. ................................ 385/37 |

* cited by examiner

Primary Examiner—Shrive P. Beck
Assistant Examiner—Michael Cleveland
(74) Attorney, Agent, or Firm—Lowenstein Sandler PC

(57) ABSTRACT

In accordance with the invention, an optical fiber is provided with a metal coating of controlled variable thickness by the steps of disposing the fiber in position for receiving coating metal from a metal source, and depositing metal while moving a shadow mask between the fiber and the source to provide patterning of deposited metal. Advantageously, the mask is translated at a constant velocity perpendicular to the fiber. The method is particularly useful for the fabrication of adjustable Bragg gratings.

14 Claims, 4 Drawing Sheets

METHOD FOR MAKING OPTICAL FIBER DEVICES HAVING VARIABLE THICKNESS METAL COATINGS

FIELD OF THE INVENTION

This invention relates to the fabrication of optical fiber devices and, in particular, to the fabrication of fiber devices having outer coatings of controlled variable thickness metal.

BACKGROUND OF THE INVENTION

Optical fiber grating devices having outer coatings of variable thickness metal are highly useful in optical communication systems. In these devices variable thickness thin metal films are used as thin film resistive heaters or strain-relief coatings for altering in controlled ways, the optical properties of the grating. For example, such devices can provide Bragg gratings with adjustable chirp for use as tunable dispersion compensating elements. See U.S. patent application Ser. No. 09/183,048 filed by Eggleton el al. on Oct. 30, 1998 and entitled "Optical Grating Devices With Adjustable Chirp."

The ability to form on-fiber metal coatings with complex but precisely defined variations in thickness is critical to producing these and other types of active grating devices. One method for forming such coatings involves electrodeposition of metal onto a fiber while it is pulled from a planting bath at a controlled rate. Although this technique can form tapered coatings with a range of thicknesses, it has the disadvantages that (i) non-monotonic variations in thickness are not straightfonvard to produce, (ii) a seed layer, typically deposited by electron beam evaporation or electroless planting, is required to initiate electrodeposition, and (iii) formation of ultrathin (<1 $\mu$m) coatings with precise variations in thickness is challenging. Accordingly there is a, need for an improved method for providing optical fiber devices with metal coatings of controlled variable thickness.

SUMMARY OF THE INVENTION

In accordance with the invention, an optical fiber is provided with a metal coating of controlled variable thickness by the steps of disposing the fiber in position for receiving coating metal from a metal source, and depositing metal while moving a shadow mask between the fiber and the source to provide patterning of deposited metal. Advantageously, the mask is translated at a constant velocity perpendicular to the fiber. The method is particularly useftil for the fabrication of adjustable Bragg gratings.

BRIEF DESCRIPTION OF THE DRAWINGS

The nature, advantages and various additional features of the invention will appear more fully upon consideration of the illustrative embodiments now to be described in connection with the accompanying drawings. In the drawings.

It is to be understood that these drawings are for purposes of illustrating the concepts of the invention and are not to scale.

DETAILED DESCRIPTION

Figure 1:
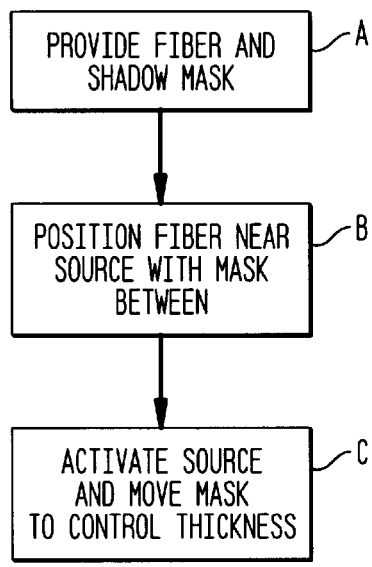
FIG. 1 is a flow diagram of the steps in providing an optical fiber with a metal coating of controlled, variable thickness.

Referring to the drawings, FIG. 1 is a flow diagram of the steps in providing an optical fiber with a metal coating of controlled, variable thickness. As shown in block A the first step is to provide a fiber to be coated and a shadow mask to define the coating pattern. The fiber to be coated is typically a length of optical fiber in which a grating has been formed by techniques well known in the art. The grating can be a Bragg grating or a long-period grating. The fiber has its polymer coating removed.

The shadow mask is a template or mask constructed such that translation of the mask over the fiber during deposition of metal yields a coating that varies in thickness along the length of the fiber in the desired manner.

Figure 2A:
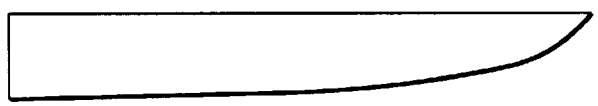
FIGS. 2A, 2B, 2C and 2D illustrate exemplary shadow masks useful in the process of FIG. 1.
Figure 2B:
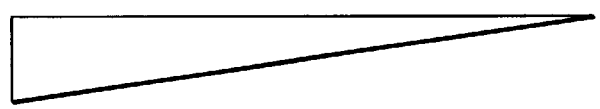
Figure 2C:
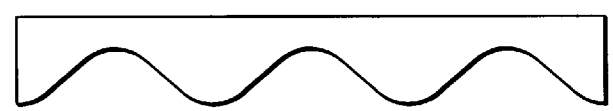
Figure 2D:

FIGS. 2A, 2B, 2C and 2D show actual size illustrations of exemplary shadow masks. FIG. 2A illustrates a mask shaped to form a coating whose thickness varies inversely with position along the fiber. FIG. 2B is shaped to form a coating whose thickness varies linearly along the fiber. FIG. 2C is shaped to provide a periodic sinusoidal variation in thickness and FIG. 2D provides a non-monotonic variation wherein the thickness is reduced in an interior region of the coated length.

A suitable mask is designed by specifying the length of the coating, the desired thickness profile, the rate that metal will be deposited on the fiber, and the speed that the mask will translate. A personal computer equipped with spreadsheet/plotting software and a laser printer provide the ability to generate to-scale hard copy outlines of the necessary structure. A mask can be produced by simply cutting along the printed lines.

The next step, shown in Block B, is to position the fiber near a metal source for receiving coating metal from the source. The mask is placed in position between the source and the fiber to control the access of metal to the fiber and thereby to control the variation of deposited metal thickness along the fiber.

Figure 3:
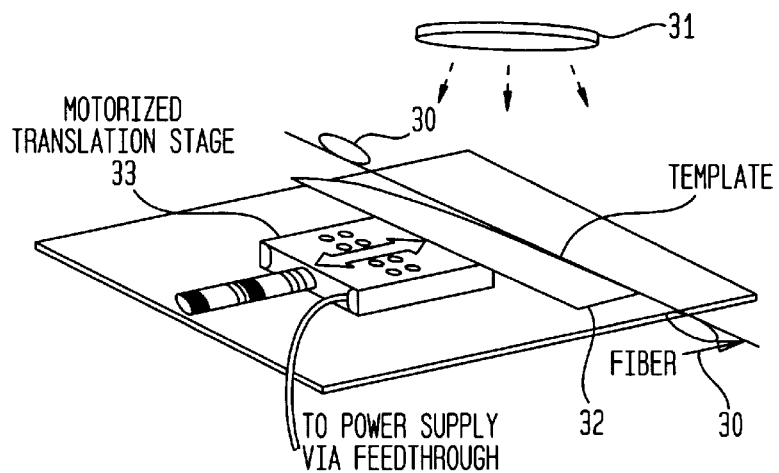
FIG. 3 schematically illustrates apparatus useful in practicing the method of FIG. 1.

FIG. 3 illustrates advantageous apparatus for practicing the method. The fiber 30 is disposed near metal source 31 for receiving the coating metal when the source 31 is activated to emit coating metal. The mask 32 is mounted on a motorized translation stage 33 for moving the mask between the fiber 30 and source 31. The metal source is typically a vacuum evaporation source. Advantageous metal sources are gold, titanium, chromium, platinum and aluminum.

The third step (Block C) is to move the mask in the space between the fiber 30 and the source 31 while the source is activated to deposit metal as by bombarding it with a beam of electrons. The motion, effected by translation stage 33, is preferably at constant velocity in a direction perpendicular to the length of fiber 30. Typical speeds are in the range 0.05–0.2 cm/min and advantageously 0.1 cm/min.

Blanket deposition of metal while the stage moves the template over the fiber yields a coating (on one side of the fiber) whose thickness varies in the desired manner along the specified length of fiber. Coatings formed in this way also vary in thickness around the circumference of the fiber. At each point along the length, the thickness varies radially from a maximum where the fiber was nearest the source to an essential zero minimum at the underside opposite the source. Variations that arise from shadowing caused by the curvature of the fiber itself do not, in general, affect the axial profile of resistive heating produced by the film, and are therefore typically unimportant. If necessary, they can be eliminated by rotating the fiber about its axis during the deposition. Additional variations arise from translation of the template across the diameter of the fiber. For anticipated applications, these can be neglected since they are small compared to those that exist along the length of the fiber. An advantage of deposition on only one side of the fiber is that it enables multiple coated regions to be deposited on a single fiber. Devices with these geometries potentially allow independent control of several characteristics of the fiber.

A plurality of metal layers can be deposited on the same fiber. And if intervening insulating layers are applied, the plural metal layers can be connected to respective independent electrical sources.

The invention may now be better understood by consideration of the following specific examples.

Figure 4:
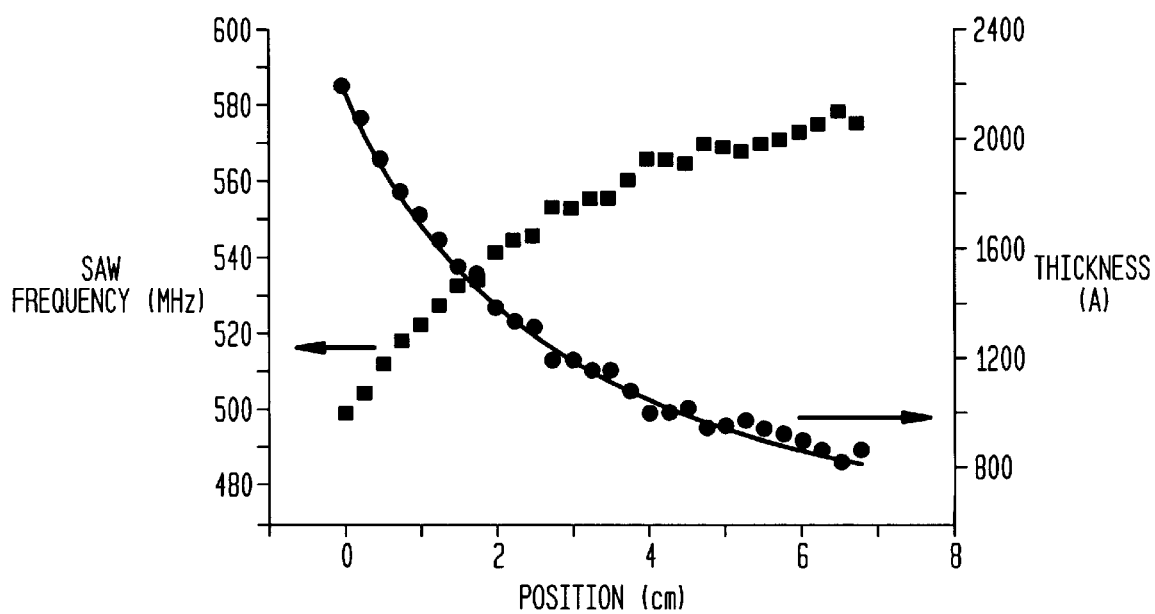
FIGS. 4, 5A, 5B and 6 are graphical illustrations illustrating the characteristics of exemplary devices made using the process of FIG. 1.

To verify that the procedures described above produce coatings with desired profiles, we evaporated titanium (adhesion promoter, with a uniform thickness of 50 A) and gold onto a narrow (~1 mm) strip of a flat test wafer (silicon with native oxide) using the template illustrated in FIG. 2(a) and the apparatus shown in FIG. 3. We then used a laser-based ultrasonic method to evaluate the thickness of the gold layer as a function of position along the wafer. (A thin film of platinum was added on top of the gold to enable thermal excitation with laser pulses at 1064 nm.) The measurements directly revealed the dependence of the frequency of the surface acoustic wave (Rayleigh mode) on position along the coated wafer. (FIG. 4, solid squares). Film thicknesses (FIG. 4, solid circles) were then calculated from the measured frequencies by using the appropriate acoustic waveguide model for the multilayer structure, and the densities and mechanical properties of titanium, gold and platinum films and the silicon substrate, the thickness of the platinum and the acoustic wavelength (7.25 $\mu$m, empirically calibrated from its nominal value of 7.40+0.15 $\mu$m) to yield agreement between the expected and calculated thickness of the unshadowed gold film at an end of the wafer. The solid line illustrated in FIG. 4 represents the desired profile; the agreement between the desired and measured thicknesses validates the approach to fabrication.

To illustrate the utility of the fabrication techniques, we then constructed and tested two types of active fiber grating devices that use complex on-fiber resistive coatings. One forms the basis for add/drop filters that enable simultaneous shifting and broadening of their transmission spectra. Currently devices that have this capability use bulk heaters and coolers connected by a thermally conductive plate with a v-groove into which a segment of fiber that contains a grating is mounted with a suitable adhesive. Although these devices have good optical characteristics, they are costly, bulky, complicated to build and do not make efficient use of electrical power. Using the shadow masking techniques described here it is easy to deposit linearly tapered metal coatings for on-fiber resistive heaters that can provide electrically tunable shifting and broadening of the reflection spectra of add/drop gratings. In these devices, resistive heating occurs at rates that vary with the local thickness (i.e. resistance) of the film. For tapered coatings, this distributed and spatially varying heating causes gradients in temperature along the grating that broaden and shift the reflection spectrum.

Figure 5A:
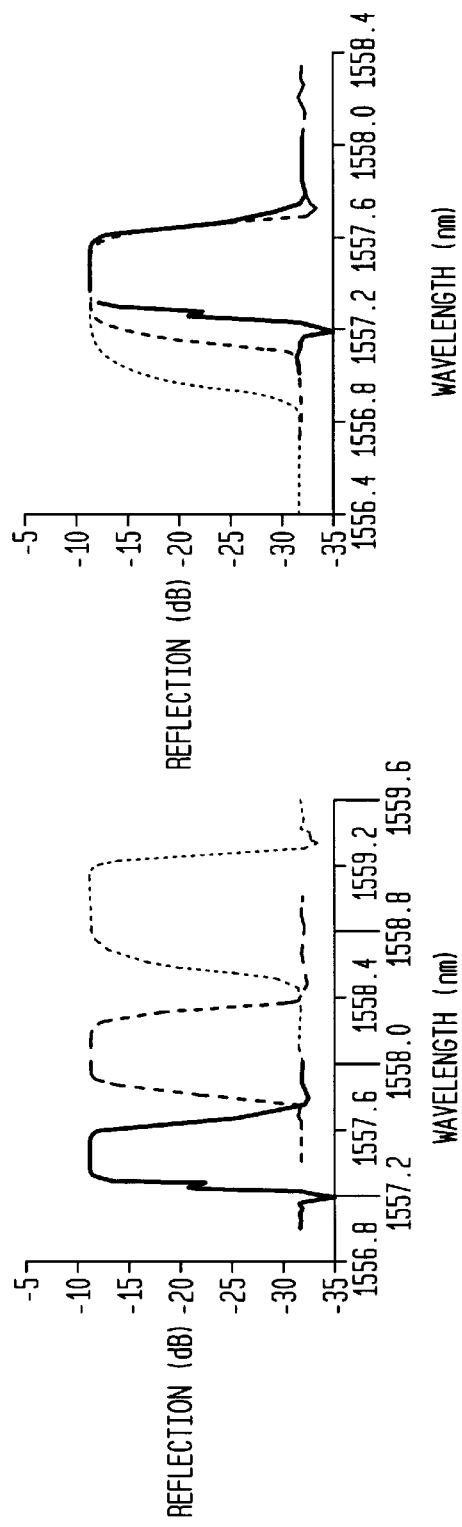
Figure 5B:
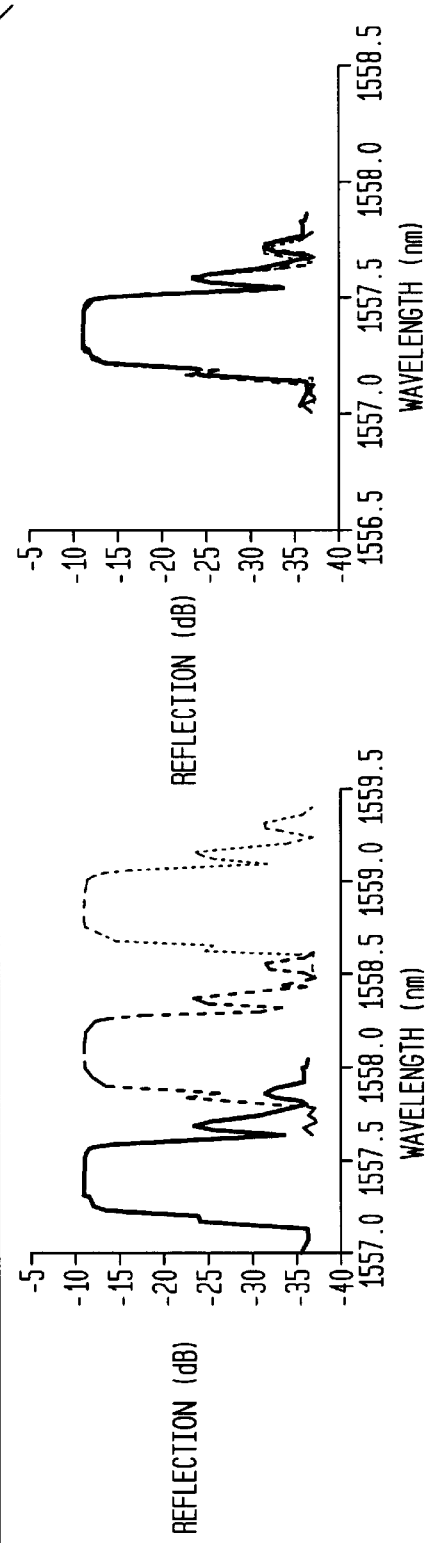

FIG. 5 shows reflection spectra of two devices at various voltages applied to the on-fiber coatings. FIG. 5(a) shows data from a device that uses a linearly tapered coating. FIG. 5(b) shows, for reference, data from a device that uses a uniform coating. The data illustrate, as expected, that devices that use tapered coatings exhibit not only a shift in the reflection spectrum as the fiber is heated by current flowing through the films, but they also show a broadening because the heating varies along the grating. The broadening increases as the thermal gradient (i.e. the applied voltage) increases. The simplicity, small size and good operating characteristics of adjustable gratings that use tapered on-fiber thin film heaters make them attractive for add/drop applications.

The geometry of the chirp of the grating is not critical for add/drop filters in many cases because only a broadening of the spectrum is required. For this reason, we used simple linearly tapered coatings for the devices described above. When Bragg gratings are used for dispersion compensation, however, the geometry of the chirp is critical. For active linear dispersion compensating gratings, the chirp should be both strictly linear and adjustable. Flowing current through a coating whose thickness varies inversely with position along the fiber generates resistive heating at rates that depend linearly on position. These types of coatings on sections of fiber that contain long apodized Bragg gratings, therefore, enable electrically tunable linear temperature gradients that linearly chirp the gratings. The methods described here (FIG. 1) allow formation of coatings with similar thickness profiles, but with much smaller total thicknesses and with a reduced number of processing steps.

Figure 6:
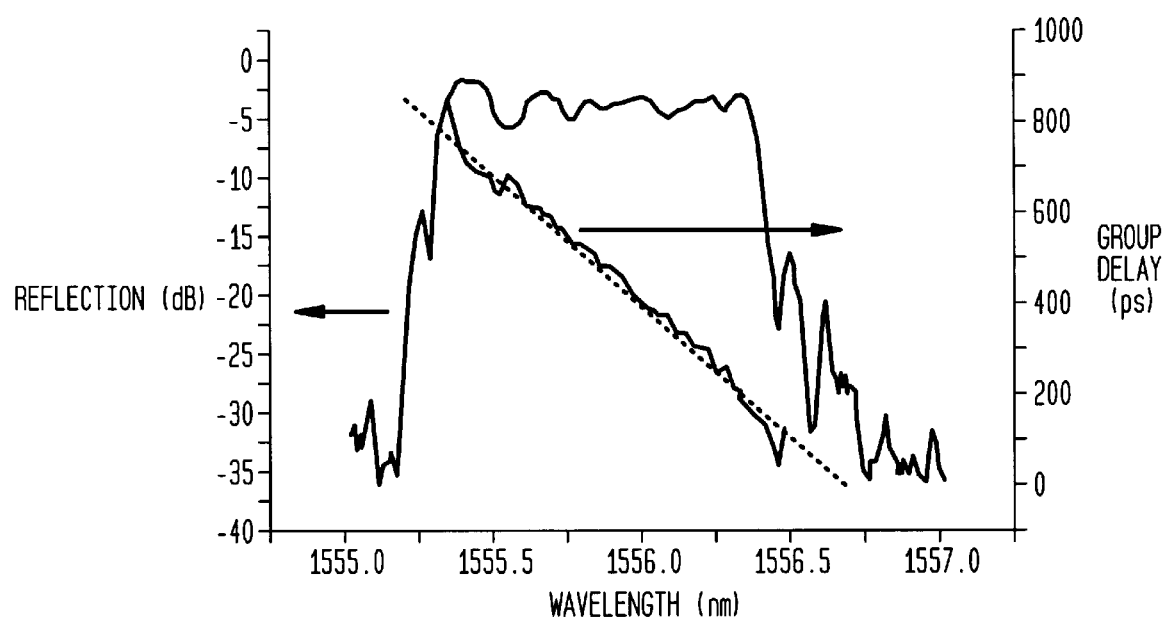

FIG. 6 shows data from a typical device with an inversely tapered coating formed using these methods. The linear group delays and the uniform broadening of the reflection peak verify that the thermally induced chirp is linear. (The nonuniformities in the reflection spectrum arise mainly from imperfect apodization of the Bragg grating itself).

Thus time-dependent shadow mask patterning with translation stages and suitable templates allows formation of coatings with a variety of thickness profiles on optical fiber. This approach to fabrication is well suited for producing ultrathin (<~1 $\mu$m) coatings for distributed on-fiber resistive heaters. These structures can be used with apodized Bragg gratings for dispersion compensators and for a thermally actuated add/drop filter. For many applications, the technique complements the previously described electroforming method: it cannot easily form thick (>2 $\mu$m) coatings, but it works well with films that are thinner than those that can be fabricated easily with electrolbrrning. These thin coatings typically do not have significant effects on the mechanical response of the fiber to strain, and are therefore ideal for devices that combine, in a largely uncoupled manner, distributed heating with mechanical strain. Another attractive feature of the shadow masking approach is that it can readily produce films with non-monotonic variations in thickness. This capability enables, for example, the formation of on-fiber heaters for electrically tunable sampled, superstructure or phase shifted gratings.

It is to be understood that the above-described embodiments are illustrative of only a few of the many possible specific embodiments which car represent applications of the principles of the invention. Numerous and varied other arrangements can be made by those skilled in the art without departing from the spirit and scope of the invention.

What is claimed:

1. A method for making an optical fiber device having a metal coating of controlled variable thickness comprising the steps of:

providing a length of optical fiber to be coated and a shadow mask to define the coating pattern;

disposing the fiber in position for receiving coating metal from a metal source and disposing said mask between the source and the fiber;

activating said metal source to emit coating metal and moving said mask in relation to the fiber to control the access of metal to the fiber and thereby control the variation of deposited metal thickness along the fiber.

2. The method of claim 1 wherein said mask is moved in a direction perpendicular to the length of said fiber.

3. The method of claim 2 wherein said mask is moved at a speed in the range 0.05–0.2 cm/min.

4. The method of claim 1 wherein said mask is shaped to form a coating whose thickness varies inversely with position along the fiber.

5. The method of claim 1 wherein said mask is shaped to form a coating whose thickness varies linearly along the fiber.

6. The method of claim 1 wherein said mask is shaped to form a coating whose thickness varies non-monotonically along the fiber.

7. The method of claim 1 wherein said mask is shaiped to form a coating whose thickness is reduced in an interior position of the coated length.

8. The method of claim 1 wherein said mask is shaped to form a coating whose thickness varies periodically along the fiber.

9. The method of claim 1 wherein said metal source comprises a source of gold, titanium, chromium, platinum or aluminum.

10. The method of claim 1 wherein said length of fiber comprises an optical grating.

11. The method of claim 1 wherein said length of fiber comprises a Bragg grating.

12. The method of claim 1 wherein said length of fiber comprises a long period grating.

13. The method of claim 1 wherein said metal coating has a thickness of less than two microns.

14. The method of claim 1 further comprising the step of rotating said fiber while the metal source is activated.

* * * * *